United States Patent
Lu et al.

(10) Patent No.: US 9,260,947 B2
(45) Date of Patent: Feb. 16, 2016

(54) ADAPTIVE NEWTON'S METHOD FOR RESERVOIR SIMULATION

(75) Inventors: Pengbo Lu, Sugar Land, TX (US); Bret L. Beckner, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 324 days.

(21) Appl. No.: 13/394,319

(22) PCT Filed: Sep. 2, 2010

(86) PCT No.: PCT/US2010/047678
§ 371 (c)(1),
(2), (4) Date: Mar. 5, 2012

(87) PCT Pub. No.: WO2011/066021
PCT Pub. Date: Jun. 3, 2011

(65) Prior Publication Data
US 2012/0232861 A1 Sep. 13, 2012

Related U.S. Application Data

(60) Provisional application No. 61/265,103, filed on Nov. 30, 2009.

(51) Int. Cl.
G06G 7/48 (2006.01)
E21B 43/00 (2006.01)
G01V 99/00 (2009.01)

(52) U.S. Cl.
CPC ............... *E21B 43/00* (2013.01); *G01V 99/00* (2013.01)

(58) Field of Classification Search
CPC ................................ E21B 43/00; G01V 99/00
USPC ...................................................... 703/2, 10
See application file for complete search history.

(56) References Cited

U.S. PATENT DOCUMENTS

| 5,537,320 A | 7/1996 | Simpson et al. |
| 5,706,194 A | 1/1998 | Neff et al. |

(Continued)

FOREIGN PATENT DOCUMENTS

| WO | 99/28767 | 6/1999 |
| WO | 2007/022289 | 2/2007 |

(Continued)

OTHER PUBLICATIONS

Byer, T.J. et al. (1998), "Preconditioned Newton Methods for Fully Coupled Reservoir and Surface Facility Models," SPE 49001, 1998 SPE Annual Tech. Conf. and Exh., pp. 181-188.

(Continued)

*Primary Examiner* — Aniss Chad
(74) *Attorney, Agent, or Firm* — ExxonMobil Upstream Research Company, Law Dept.

(57) ABSTRACT

A method of performing a simulation of a subsurface hydrocarbon reservoir. The reservoir is approximated by a reservoir model having a plurality of cells. Each cell has an equation set representing a reservoir property. An initial guess is provided to a solution for a system of equations formed using the equation set for each of the cells. An iterative root-finding method and the initial guess are used to solve for a solution to the system of equations. When the number of non-converged cells is greater than a predetermined amount, neighboring converged cells are added to the non-converged cells. Parts of the method are repeated, substituting the solved solution for the initial guess and the equation sets corresponding to the non-converged cells for the first system of equations, until substantially all equation sets satisfy the convergence criterion. The solved solution is outputted as a simulation of the subsurface reservoir.

23 Claims, 11 Drawing Sheets

(56) References Cited

U.S. PATENT DOCUMENTS

| | | |
|---|---|---|
| 5,710,726 A | 1/1998 | Rowney et al. |
| 5,747,673 A | 5/1998 | Ungerer et al. |
| 5,953,680 A | 9/1999 | Divies et al. |
| 6,018,498 A | 1/2000 | Neff et al. |
| 6,052,520 A | 4/2000 | Watts, III |
| 6,106,561 A | 8/2000 | Farmer |
| 6,128,577 A | 10/2000 | Assa et al. |
| 6,138,076 A | 10/2000 | Graf et al. |
| 6,230,101 B1 | 5/2001 | Wallis |
| 6,374,185 B1 | 4/2002 | Taner et al. |
| 6,549,854 B1 | 4/2003 | Malinverno et al. |
| 6,597,995 B1 | 7/2003 | Cornu et al. |
| 6,662,146 B1 | 12/2003 | Watts |
| 6,810,370 B1 | 10/2004 | Watts, III |
| 6,826,483 B1 | 11/2004 | Anderson et al. |
| 7,069,149 B2 | 6/2006 | Goff et al. |
| 7,089,166 B2 | 8/2006 | Malthe-Sorenssen et al. |
| 7,254,091 B1 | 8/2007 | Gunning et al. |
| 7,277,796 B2 | 10/2007 | Kuchuk et al. |
| 7,286,972 B2 | 10/2007 | Maker |
| 7,363,163 B2 | 4/2008 | Valec-Dupin et al. |
| 7,376,539 B2 | 5/2008 | Lecomte |
| 7,406,878 B2 | 8/2008 | Rieder et al. |
| 7,424,415 B2 | 9/2008 | Vassilev |
| 7,433,786 B2 | 10/2008 | Adams |
| 7,451,066 B2 | 11/2008 | Edwards et al. |
| 7,467,044 B2 | 12/2008 | Tran et al. |
| 7,480,205 B2 | 1/2009 | Wei |
| 7,505,882 B2 * | 3/2009 | Jenny et al. ............. 703/2 |
| 7,516,056 B2 | 4/2009 | Wallis et al. |
| 7,523,024 B2 | 4/2009 | Endres et al. |
| 7,526,418 B2 | 4/2009 | Pita et al. |
| 7,542,037 B2 | 6/2009 | Fremming |
| 7,546,229 B2 | 6/2009 | Jenny et al. |
| 7,548,840 B2 | 6/2009 | Saaf |
| 7,577,527 B2 | 8/2009 | Velasquez |
| 7,596,056 B2 | 9/2009 | Keskes et al. |
| 7,596,480 B2 | 9/2009 | Fung et al. |
| 7,603,265 B2 | 10/2009 | Mainguy et al. |
| 7,617,082 B2 | 11/2009 | Childs et al. |
| 7,620,800 B2 | 11/2009 | Huppenthal et al. |
| 7,640,149 B2 | 12/2009 | Rowan et al. |
| 7,706,981 B2 | 4/2010 | Wilkinson et al. |
| 7,711,532 B2 | 5/2010 | Dulac et al. |
| 7,756,694 B2 | 7/2010 | Graf et al. |
| 7,796,469 B2 | 9/2010 | Keskes et al. |
| 7,809,537 B2 | 10/2010 | Hemanthkumar et al. |
| 7,809,538 B2 | 10/2010 | Thomas |
| 7,822,554 B2 | 10/2010 | Zuo et al. |
| 7,860,654 B2 | 12/2010 | Stone |
| 7,877,246 B2 | 1/2011 | Moncorge et al. |
| 7,920,970 B2 | 4/2011 | Zuo et al. |
| 7,925,481 B2 | 4/2011 | Van Wagoner et al. |
| 7,933,750 B2 | 4/2011 | Morton et al. |
| 7,953,585 B2 | 5/2011 | Gurpinar et al. |
| 7,986,319 B2 | 7/2011 | Dommisse et al. |
| 7,996,154 B2 | 8/2011 | Zuo et al. |
| 8,050,892 B2 | 11/2011 | Hartman |
| 8,095,345 B2 | 1/2012 | Hoversten |
| 8,145,464 B2 | 3/2012 | Arnegaard et al. |
| 8,190,405 B2 | 5/2012 | Appleyard |
| 8,204,726 B2 | 6/2012 | Lee et al. |
| 8,204,727 B2 | 6/2012 | Dean et al. |
| 8,209,202 B2 | 6/2012 | Narayanan et al. |
| 8,249,842 B2 | 8/2012 | Ghorayeb et al. |
| 8,255,195 B2 | 8/2012 | Yogeswarent |
| 8,271,248 B2 | 9/2012 | Pomerantz et al. |
| 8,275,593 B2 | 9/2012 | Zhao |
| 8,280,635 B2 | 10/2012 | Ella et al. |
| 8,280,709 B2 | 10/2012 | Koutsabeloulis et al. |
| 8,301,429 B2 | 10/2012 | Hajibeygi et al. |
| 8,359,184 B2 | 1/2013 | Massonnat |
| 8,359,185 B2 | 1/2013 | Pita et al. |
| 8,412,502 B2 * | 4/2013 | Moncorge et al. ............. 703/10 |
| 8,429,671 B2 | 4/2013 | Wood et al. |
| 8,452,580 B2 | 5/2013 | Strebelle |
| 8,515,678 B2 | 8/2013 | Pepper et al. |
| 8,515,720 B2 | 8/2013 | Koutsabeloulis et al. |
| 8,532,967 B2 | 9/2013 | Torrens et al. |
| 8,532,969 B2 | 9/2013 | Li et al. |
| 8,577,660 B2 | 11/2013 | Wendt et al. |
| 8,589,135 B2 * | 11/2013 | Middya et al. ............. 703/10 |
| 8,612,194 B2 | 12/2013 | Horne et al. |
| 8,655,632 B2 | 2/2014 | Moguchaya |
| 8,674,984 B2 | 3/2014 | Ran et al. |
| 8,812,334 B2 | 8/2014 | Givens et al. |
| 2006/0036418 A1 | 2/2006 | Pita et al. |
| 2006/0122780 A1 | 6/2006 | Cohen et al. |
| 2006/0265204 A1 | 11/2006 | Wallis et al. |
| 2006/0269139 A1 | 11/2006 | Keskes et al. |
| 2007/0277115 A1 | 11/2007 | Glinsky et al. |
| 2007/0279429 A1 | 12/2007 | Ganzer et al. |
| 2007/0282582 A1 | 12/2007 | Saaf |
| 2008/0126168 A1 | 5/2008 | Carney et al. |
| 2008/0133550 A1 | 6/2008 | Orangi et al. |
| 2009/0012765 A1 * | 1/2009 | Raphael ............. 703/10 |
| 2009/0055141 A1 | 2/2009 | Mocorge et al. |
| 2009/0071239 A1 | 3/2009 | Rojas et al. |
| 2010/0161300 A1 | 6/2010 | Yeten et al. |
| 2010/0185428 A1 | 7/2010 | Vink |
| 2010/0286971 A1 | 11/2010 | Middya et al. |
| 2010/0307755 A1 | 12/2010 | Xu et al. |
| 2010/0312535 A1 | 12/2010 | Chen et al. |
| 2010/0324873 A1 | 12/2010 | Cameron |
| 2011/0015910 A1 | 1/2011 | Ran et al. |
| 2011/0040533 A1 | 2/2011 | Torrens et al. |
| 2011/0046927 A1 | 2/2011 | Jeong et al. |
| 2011/0054857 A1 | 3/2011 | Moguchaya |
| 2011/0082676 A1 | 4/2011 | Bratvedt et al. |
| 2011/0106514 A1 | 5/2011 | Omeragic et al. |
| 2011/0115787 A1 | 5/2011 | Kadlec |
| 2011/0251830 A1 | 10/2011 | Hilliard et al. |
| 2011/0310101 A1 | 12/2011 | Prange et al. |
| 2011/0313745 A1 | 12/2011 | Mezghani et al. |
| 2012/0059590 A1 | 3/2012 | Ameen |
| 2012/0059640 A1 | 3/2012 | Roy et al. |
| 2012/0065951 A1 | 3/2012 | Roy et al. |
| 2012/0136641 A1 | 5/2012 | Fung et al. |
| 2012/0150506 A1 | 6/2012 | Han et al. |
| 2012/0150518 A1 | 6/2012 | Güyagüler et al. |
| 2012/0159124 A1 | 6/2012 | Hu et al. |
| 2012/0173220 A1 | 7/2012 | Li et al. |
| 2012/0179436 A1 | 7/2012 | Fung |
| 2012/0203515 A1 | 8/2012 | Pita et al. |
| 2012/0215512 A1 | 8/2012 | Sarma |
| 2012/0221303 A1 | 8/2012 | Wallis et al. |
| 2012/0232799 A1 | 9/2012 | Zuo et al. |
| 2012/0232859 A1 | 9/2012 | Pomerantz et al. |
| 2012/0271609 A1 | 10/2012 | Laake et al. |
| 2012/0296617 A1 | 11/2012 | Zuo et al. |
| 2013/0030782 A1 | 1/2013 | Yogeswaren |
| 2013/0046524 A1 | 2/2013 | Gathogo et al. |
| 2013/0054201 A1 | 2/2013 | Posamentier et al. |
| 2013/0151159 A1 | 6/2013 | Pomerantz et al. |
| 2013/0312481 A1 | 11/2013 | Pelletier et al. |
| 2014/0012557 A1 | 1/2014 | Tarman et al. |

FOREIGN PATENT DOCUMENTS

| | | |
|---|---|---|
| WO | 2007/116008 | 10/2007 |
| WO | 2009/138290 | 11/2009 |

OTHER PUBLICATIONS

Klie, H. et al. (2005), "Krylov-Secant Methods for Accelerating the Solution for Fully Implicit Formulations," SPE 92863, 2005 SPE Reservoir Simulation Symposium, 9 pgs.

Younis, R.M. et al. (2009), "Adaptively-Localized-Continuation-Newton: Reservoir Simulation Nonlinear Solvers that Converge All the Time," SPE 119147, 2009 SPE Reservoir Simulation Symposium, 21 pgs.

(56) References Cited

OTHER PUBLICATIONS

Byer, T.J., et al., (1998), "Preconditioned Newton Methods for Fully Coupled Reservoir and Surface Facility Models", *SPE* 49001, 1998 *SPE Annual Tech. Conf, and Exh.*, pp. 181-188.

Gai, X., et al., (2005), "A Timestepping Scheme for Coupled Reservoir Flow and Geomechanics in Nonmatching Grids", *SPE* 97054, 2005 *SPE Annual Tech. Conf and Exh.*, pp. 1-11.

Klie, H., et al., (2005), "Krylov-Secant Methods for Accelerating the Solution of Fully Implicit Formulations", *SPE* 92863, 2005 *SPE Reservoir Simulation Symposium*, 9 pgs.

Lu, B., et al., (2007), "Iteratively Coupled Reservoir Simulation for Multiphase Flow", *SPE* 110114, 2007 *SPE Annual Tech. Conf and Exh.*, pp. 1-9.

Ahmadizadeh, M., et al., (2007), "Combined Implicit or Explicit Integration Steps for Hybrid Simulation", *Earthquake Engng. & Struct. Dyn.*, vol. 36(15), pp. 2325-2343.

Younis, R.M., et al., (2009), "Adaptively-Localized-Continuation-Newton: Reservoir Simulation Nonlinear Solvers That Converge All the Time", *SPE* 119147, 2009 *SPE Reservoir Simulation Symposium*, pp. 1-21.mos.

\* cited by examiner

40 ↘

Number of Unconverged Cells at Newton Iteration for Two Different Timesteps Per Dataset

| Iter# | Dataset A | | Dataset B | | Dataset C | | Dataset D | |
|---|---|---|---|---|---|---|---|---|
| 0 | 110000 | 110000 | 14500 | 14500 | 150000 | 150000 | 913824 | 913824 |
| 1 | 835 | 173 | 274 | 148 | 4382 | 4399 | 15166 | 15498 |
| 2 | 3 | 4 | 26 | 27 | 274 | 1 | 112 | 15 |
| 3 | 2 | 0 | 1 | 17 | 53 | 0 | 68 | 0 |
| 4 | 2 | | 1 | 16 | 0 | | 37 | |
| 5 | 1 | | 0 | 10 | | | 0 | |
| 6 | 0 | | | 13 | | | | |
| 7 | | | | 4 | | | | |
| 8 | | | | 2 | | | | |
| 9 | | | | 1 | | | | |
| 10 | | | | 0 | | | | |

ADAPTIVE NEWTON'S METHOD FOR RESERVOIR SIMULATION

CROSS-REFERENCE TO RELATED APPLICATION

This application is the National Stage entry under 35 U.S.C. 371 of PCT/US2010/047678, that published as WO 2011/066021 and was filed on filed 2 Sep. 2010, which claims the benefit of U.S. Provisional Application No. 61/265,103, filed on 30 Nov. 2009, each of which is incorporated herein by reference, in its entirety, for all purposes.

FIELD

Disclosed aspects and methodologies relate to reservoir simulation, and more particularly, to methods of solving multiple fluid flow equations.

BACKGROUND

This section is intended to introduce various aspects of the art, which may be associated with aspects of the disclosed techniques and methodologies. A list of references is provided at the end of this section and may be referred to hereinafter. This discussion, including the references, is believed to assist in providing a framework to facilitate a better understanding of particular aspects of the disclosure. Accordingly, this section should be read in this light and not necessarily as admissions of prior art.

Reservoir simulators solve systems of equations describing the flow of oil, gas and water within subterranean formations. In a reservoir simulation model, the subterranean formation is mapped on to a two- or three-dimensional grid comprising a plurality of cells. Each cell has an associated equation set that describes the flow into the cell, the flow out of the cell, and the accumulation within the cell. For example, if the reservoir is divided into 1000 cells, there will be 1000 equation sets that need to be solved.

To model the time-varying nature of fluid flow in a hydrocarbon reservoir, the solution of the equations to be solved on the grid cells varies over time. In the reservoir simulator, solutions are determined at discrete times. The time interval between solutions is called the timestep. For example, the reservoir simulator may calculate the pressures and saturations occurring at the end of a month, so the timestep is a month and a single solution to the equation set is needed. To calculate the changes in pressure and saturation over a year, the simulator in this example calculates twelve monthly solutions. The time spent solving this problem is roughly twelve times the time spent solving the single month problem.

The size of the timestep that a simulator can take depends on a number of factors. One factor is the numerical method employed to find the solution. As some reservoir models may have thousands or millions of cells, various methods have been proposed to efficiently solve the large number of equations to be solved by a reservoir simulation model. One popular strategy for finding the solutions to these systems of equations is to use an iterative root-finding method. These methods find approximate solutions that get progressively closer to the true the true solution through iteration and solution updating. Newton's Method is one type of iterative root-finding method in general use. In Newton's Method, the set of simulation equations are cast into a form that makes the solution an exercise in finding the zeros of a function, i.e. finding x such that $f(x)=0$.

FIG. 1 is a graph 8 that depicts Newton's Method for a single equation. Curve 10 is the function $f(x)$. What is sought is the value x where $f(x)=0$, indicated by point 12. The initial guess is $x_0$. The second guess is calculated by taking the line 14 tangent to $f(x)$ at $x_0$ and applying the formula $x_1=x_0-(f(x_0)/f'(x_0))$. Here $f'(x)$ denotes the derivative of the function $f(x)$ and is the slope of the tangent line at x. The third guess, $x_2$, uses the line 16 tangent at the second guess $(x_1)$ and applies the same formula, $x_2=x_1-(f(x_1)/f'(x_1))$. Continuing this iterative algorithm one can get very close to the root of $f(x)$, i.e., point 12, in a modest number of iterations.

Reservoir simulators have expanded Newton's Method to solve for the many thousands of equations at each timestep. Instead of one equation a system of equations is used:

$$f_1(x_1, \ldots, x_n) = 0$$
$$f_2(x_1, \ldots, x_n) = 0$$
$$\vdots$$
$$f_n(x_1, \ldots, x_n) = 0$$
[Equation 1]

where $f_1(x_1, \ldots, x_n)=0$ are the reservoir simulation equations for grid block 1 containing the variables $x_1$ through $x_n$, and n is the number of grid cells. The variables, $x_1, \ldots, x_n$, are typically pressures and saturations at each cell.

To apply Newton's method to this system of equations the tangent of the function is needed to use in the iterative method, like that described above for the single equation above. The tangent of this matrix A is called the Jacobian J and is composed of the derivatives of the functions with respect to the unknowns.

$$J = \begin{bmatrix} \frac{\partial f_1}{\partial x_1} & \cdots & \frac{\partial f_1}{\partial x_n} \\ \vdots & \ddots & \vdots \\ \frac{\partial f_n}{\partial x_1} & \cdots & \frac{\partial f_n}{\partial x_n} \end{bmatrix}$$
[Equation 2]

As in the case with one equation an initial guess $\vec{x}_0$ is made, where $\vec{x}_0$ is a vector of solutions. Each subsequent guess is formed in the same manner as that for a single variable, where $\vec{x}_i$ is formed from the previous guess $\vec{x}_{i-1}$ using the following equation:

$$\vec{x}_i = \vec{x}_{i-1} - (f(\vec{x}_{i-1})/J(\vec{x}_{i-1}))$$
[Equation 3]

This equation can be rewritten as $$J(\vec{x}_{i-1})(\vec{x}_i - \vec{x}_{i-1}) = -f(\vec{x}_{i-1})$$
[Equation 4]

which is a matrix equation of the form $A\vec{x}=\vec{b}$. The solution is thought to be converged when either the term $(\vec{x}_i - \vec{x}_{i-1})$ or $-f(\vec{x}_i)$ approaches zero, i.e. is below a small threshold, epsilon ($\epsilon$). This idea is applied thousands or millions of times over hundreds of timesteps in a reservoir simulator.

FIG. 2 is a flowchart 20 showing the steps of Newton's Method for a system of equations. At block 21, a solution vector $\vec{x}_i$, representing the solutions for the system of equations, is set to an initial guess $\vec{x}_0$. At block 22 a Jacobian Matrix $J_i$ and a vector $\vec{b}_i$ is constructed for all cells $Z_n$, or equation sets associated with the cells, using the solution vector $\vec{x}_i$. At block 23 a new solution estimate $\vec{x}_{i1}$ is obtained for all cells $Z_n$. At block 24 it is determined how many cells are unconverging, which may be defined as having associated equation sets that have not satisfied a convergence criterion. If the number of unconverging cells is zero, then at block 25 the method stops. However, if at block 26 it is determined that the number of unconverging cells is not zero, then at block 27 the solution guess vector $\vec{x}_i$ is set to the new solution estimate $\vec{x}_{i1}$ and the process returns to block 22. The method repeats until no cells are unconverging. At that point the system of equations may be considered solved.

While the Newton's Method provides a simple way to iteratively solve for solutions to systems of equations, its effectiveness is lessened when the equations in a system of equations do not uniformly converge. For example, a two-dimensional grid 30 is shown in FIGS. 3A, 3B, 3C, and 3D as having 169 cells. Each cell has an equation or equation set associated therewith. Prior to any iteration (FIG. 3A) the 169 equations are used as inputs to Newton's Method. After one iteration of Newton's Method (FIG. 3B) the equations related to 111 cells have converged (shown by the lighter-colored cells 32). In other words, some areas of the reservoir have found solutions such that the term $(\vec{x}_i - \vec{x}_{i-1})$ is below $\epsilon$ for those areas. The unconverged cells are shown as darker colored cells 34. The second iteration (FIG. 3C) uses all 169 equations, and the equations related to 147 cells have converged thereafter (as indicated by reference number 36). After the third iteration (FIG. 3D)—which also uses all 169 equations—is completed, all equations have converged. This example highlights a drawback of Newton's Method: even though most equations have converged to a solution after a single iteration, Newton's Method uses the equations for all cells for all iterations. In other words, the size of the system of equations to be solved does not change after each iteration. For a large two- or three-dimensional reservoir simulation grid having thousands or millions of cells, the time and computational power required to perform Newton's Method repeatedly may be prohibitive.

Various attempts have been made to reduce the time required to solve a system of equations using Newton's Method. Examples of these attempts are found in the following: U.S. Pat. Nos. 6,662,146, 6,052,520, 7,526,418, and 6,230,101; U.S. Patent Application No. 2009/0055141; "Krylov-Secant Methods for Accelerating the Solution of Fully Implicit Formulations" (SPE Journal, Paper No. 00092863); "Adaptively-Localized-Continuation-Newton: Reservoir Simulation Nonlinear Solvers that Converge All the Time" (SPE Journal, Paper No. 119147); and "Preconditioned Newton Methods for Fully Coupled Reservoir and Surface Facility Models" (SPE Journal, Paper No. 00049001). While each of these proposed methods may reduce the time necessary to solve a system of equations, none of the methods reduce the number of equations (or cells) required to be solved using Newton's Method. What is needed is a way to reduce the number of equations needed to be solved in successive iterations of an iterative solver such as Newton's Method.

SUMMARY

In one aspect, a method of performing a simulation of a subsurface hydrocarbon reservoir is provided. The reservoir is approximated by a reservoir model having a plurality of cells. Each cell has associated therewith an equation set representing a reservoir property. An initial guess is provided to a solution for a system of equations formed using the equation set for each of the cells. An iterative root-finding method and the initial guess are used to solve for a solution to the first system of equations. A list of unonverged cells is established. The unconverged cells have equation sets that have not satisfied a convergence criterion. When the number of unconverged cells is greater than a predetermined amount, neighbor cells of the uncovered cells are added to the list of unconverged cells. Each of the neighbor cells has an equation set that satisfies the convergence criterion. Parts of the method are repeated, substituting the solved solution for the initial guess or the most recent solved solution and substituting the equation sets corresponding to the cells in the list of unconverged cells for the system of equations or equation sets from the most recent iteration, until substantially all equation sets satisfy the convergence criterion. When substantially all equation sets satisfy the convergence criterion, the solved solution is outputted as a simulation of the subsurface reservoir.

The reservoir property may be one or more of fluid pressure, fluid saturation, and fluid flow. Some or all of the method may be performed using a computer. The iterative root-finding method may be Newton's Method. The simulation of the subsurface reservoir may be a simulation at a first timestep, and the method is repeated at additional timesteps. The solved solutions for the first timestep and the additional timesteps may be outputted, the solved solutions simulating the subsurface reservoir over time. The neighbor cells may be adjacent the cells having equation sets that have not satisfied the convergence criterion. The number of neighbor cells may be between 1 and W−1, where W is the number of cells having equation sets that satisfy the convergence criterion. Outputting the solved solution may include displaying the solved solution. The predetermined amount may be zero. A post-Newton material balance corrector may be employed when substantially all equation sets satisfy the convergence criterion. The post-Newton material balance corrector may employ an explicit molar update or total volumetric flux conservation.

In another aspect, a method of performing a simulation of a subsurface hydrocarbon reservoir is provided. The reservoir is approximated by a reservoir model having a plurality of cells. Each cell has associated therewith an equation set representing a reservoir property. A solution is estimated for a first system of equations formed using the equation sets associated with the plurality of cells. An iterative root-finding method and the estimated solution are used to find a first solved solution to the first system of equations. A list of cells is established having equation sets that have not satisfied a convergence criterion. Neighbors of the cells having equation sets that have not satisfied the convergence criteria are added to the list of cells. A second solved solution to the equation sets associated with the cells in the list of cells is identified. Portions of the method are iterated until substantially all equation sets satisfy the convergence criterion. The list of cells and the second solved solution are replaced each iteration. When substantially all equation sets satisfy the convergence criterion, the second solved solution is outputted as a simulation of the subsurface reservoir.

The second solved solution may be identified using a direct solver or an iterative root-finding method. The iterative root-finding method may be Newton's Method. A post-Newton material balance corrector may be employed when substantially all equation sets satisfy the convergence criterion.

In another aspect, a method of performing a simulation of a subsurface hydrocarbon reservoir over a plurality of timesteps is provided. The reservoir is approximated by a reservoir model having a plurality of cells. Each cell has associated therewith an equation set representing a reservoir property. A solution for a system of equations formed using the equation set for each cell in the plurality of cells is estimated. For each timestep, a root-finding method is iteratively run to solve for a solution to the system of equations, using as inputs either the initial guess or subsequent solutions derived from a previous iteration of the root-finding method. Each iteration within a timestep runs the root-finding method to solve for the solution using equation sets associated with a variable number of cells in the plurality of cells. The solved solution at each timestep is outputted when the equation sets associated with substantially all cells in the reservoir model satisfy a convergence criterion at said each timestep.

The number of cells associated with the equation sets used to solve for the solution may be varied based on the previous iteration solution. The variable number of cells may include cells having equation sets that have not satisfied the convergence criterion during the previous iteration. The variable number of cells may also include a variable border area of cells having equation sets that have satisfied the convergence criterion during the previous iteration.

In another aspect, a computer program product is provided having computer executable logic recorded on a tangible, machine readable medium. The computer program product includes: (a) code for providing an initial guess to a solution for a first system of equations formed using an equation set for each of a plurality of cells in a model of a subsurface hydrocarbon reservoir, wherein the equation set represents a reservoir property; (b) code for using an iterative root-finding method and the initial guess to solve for a solution to the first system of equations; (c) code for establishing a list of unconverged cells, the unconverged cells having equation sets that have not satisfied a convergence criterion; (d) code for adding neighbor cells of the unconverged cells to the list of unconverged cells when the number of unconverged cells is greater than a predetermined amount, each of the neighbor cells having an equation set that satisfies the convergence criterion; (e) code for repeating parts (b), (c), and (d), substituting the solved solution for the initial guess or the most recent solved solution and substituting the equation sets corresponding to the cells in the list of unconverged cells for the system of equations or equation sets from the most recent iteration, until substantially all equation sets satisfy the convergence criterion; and (f) code for outputting the solved solution as a simulation of the subsurface reservoir when substantially all equation sets satisfy the convergence criterion.

In still another aspect, a method of managing hydrocarbon resources is provided. A subsurface reservoir is approximated using a reservoir model having a plurality of cells. Each cell has an equation set associated therewith that represents a reservoir property. A solution for a system of equations formed using the equation set is estimated for each cell in the plurality of cells. For each timestep, a root-finding method is iteratively run to solve for a solution to the system of equations, using as inputs either the initial guess or subsequent solutions derived from a previous iteration of the root-finding method. Each iteration within a timestep runs the root-finding method to solve for the solution using equation sets associated with a variable number of cells in the plurality of cells. A characteristic of the subsurface reservoir is simulated using the solved solution at each timestep when the equation sets associated with substantially all cells in the reservoir model satisfy a convergence criterion at said each timestep. Hydrocarbons are managed based on the simulated characteristic.

The simulated characteristic may be fluid flow in the subsurface reservoir. Managing hydrocarbons may comprise extracting hydrocarbons from the subsurface reservoir.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION OF THE INVENTION

Figure 1:
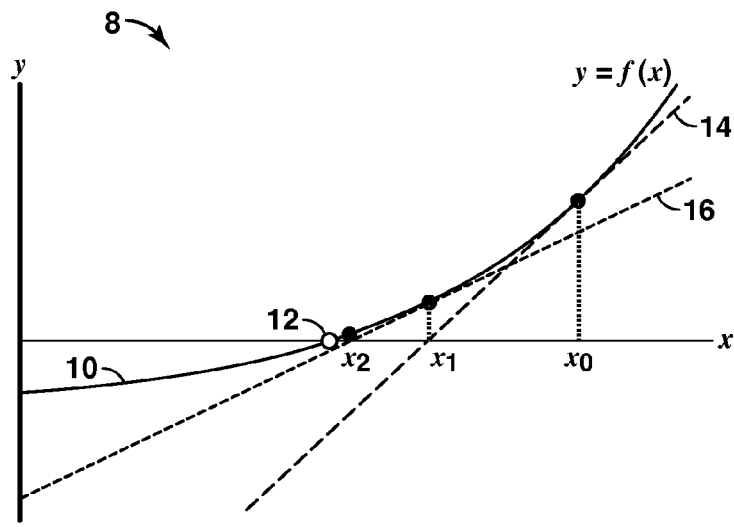
FIG. 1 is a graph demonstrating the known Newton's Method.

To the extent the following description is specific to a particular embodiment or a particular use, this is intended to be illustrative only and is not to be construed as limiting the scope of the invention. On the contrary, it is intended to cover all alternatives, modifications, and equivalents that may be included within the spirit and scope of the invention.

Some portions of the detailed description which follows are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as "providing", "using", "solving", "establishing", "adding", "repeating", "outputting", "employing", "estimating", "identifying", "iterating", "running", "approximating", "simulating", or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable transmission medium, for transmitting signals such as electrical, optical, acoustical or other form of propagated signals (e.g., carrier waves, infrared signals, digital signals, etc.).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming Additionally, the invention is not limited to implementation in any specific operating system or environment.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

As used herein, "cell" is a subdivision of a grid, for example, a reservoir simulation grid. Cells may be two-dimensional or three-dimensional. Cells may be any shape, according to how the grid is defined.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

As used herein, "exemplary" is used exclusively herein to mean "serving as an example, instance, or illustration." Any aspect described herein as "exemplary" is not necessarily to be construed as preferred or advantageous over other aspects.

As used herein, "hydrocarbon reservoirs" include reservoirs containing any hydrocarbon substance, including for example one or more than one of any of the following: oil (often referred to as petroleum), natural gas, gas condensate, tar and bitumen.

As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

As used herein, "machine-readable medium" refers to a medium that participates in directly or indirectly providing signals, instructions and/or data. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, EEPROM, or other memory chip or card, a memory stick, and other media from which a computer, a processor or other electronic device can read.

In the context of cell location, "neighbor" means adjacent or nearby.

As used herein, "subsurface" means beneath the top surface of any mass of land at any elevation or over a range of elevations, whether above, below or at sea level, and/or beneath the floor surface of any mass of water, whether above, below or at sea level.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

According to methodologies and techniques disclosed herein, an adaptive iterative root-finding method is used to solve systems of reservoir simulation equations at each desired timestep. As previously explained, an iterative root-finding method such as Newton's Method characterizes the system of simulation equations into a form that makes the solution an exercise in finding the zeros of a function, i.e. finding x such that f(x)=0. It is observed that in reservoir simulators the convergence behavior of Newton's Method is non-uniform through the reservoir grid. Some parts of the reservoir grid converge (i.e., the term $(\vec{x}_i - \vec{x}_{i-1})$ is below $\epsilon$) in a single iteration while other parts of the reservoir grid require many iterative steps to converge. The standard Newton's Method requires that equations for the entire reservoir grid system are solved at each iteration, regardless whether parts of the reservoir have already converged. In an aspect, a method is provided to adaptively target an iterative method like Newton's Method to only a portion of the reservoir cells while not losing the effectiveness of the convergence method.

More specifically, it is noted that portions of a reservoir simulation domain are relatively easy to solve while other areas are relatively hard to solve. Typical reservoir simulation models involve the injection or production of fluid at specific locations. It is the areas around these injection/production locations that the hard solutions typically appear. This leads to the variability in the solution characteristics in a reservoir simulator. Applying standard methods that apply the same technique to all areas of the reservoirs will suffer from a "weakest link" phenomenon, i.e. the solution method will apply the same amount of effort in solving in the problem in the easy and hard areas, thereby leading to overwork on the total solution.

Figures 4, 5:
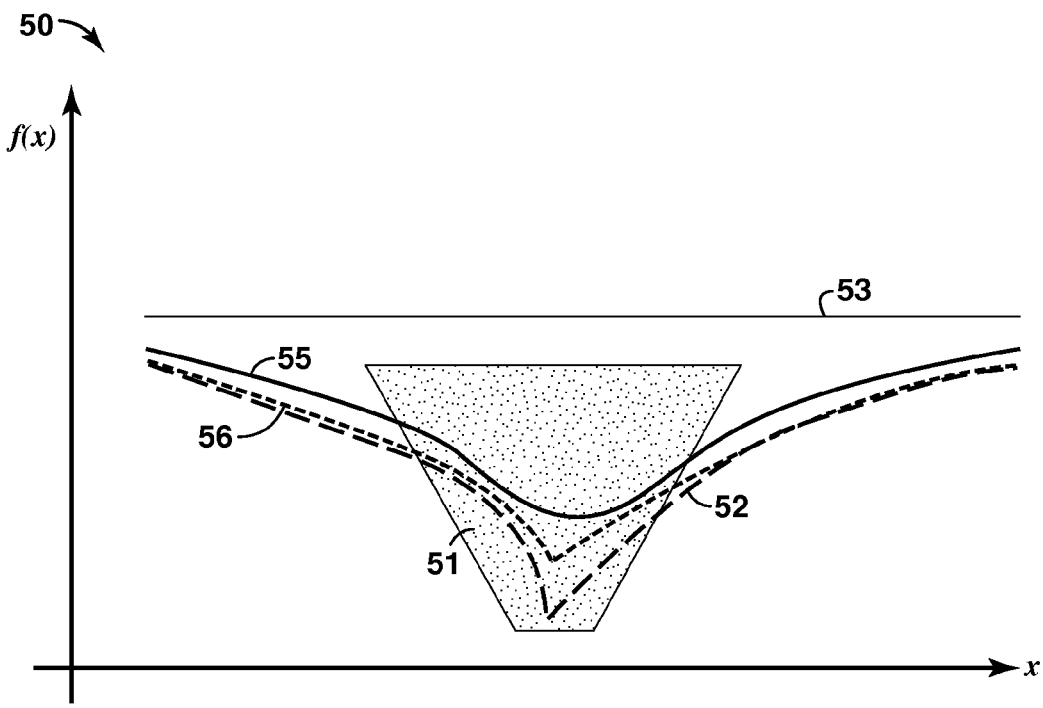
FIG. 4 is a chart showing the number of unconverged cells using a known Newton's Method.
FIG. 5 is a graph demonstrating a strategy for performing an adaptive iterative equation solving method according to disclosed methodologies and techniques.

FIG. 4 is a chart 40 showing four empirical datasets from actual reservoirs showing this "weakest link" characteristic of simulation solutions and the observation that simulation models are constrained by a small subset of the actual grid cells. In these four simulation runs, the number of unconverged cells, "hard cells", at each iteration was noted at two different timesteps. If the simulation system converges uniformly at each iteration then all the grid cells should approach the true solution (i.e., converge) at the same time. However, the empirical data does not show uniform convergence. Dataset A shows that after the first iteration 109,165 of the 110,000 cells have converged with only 835 cells not converging. The conventional Newton's Method uses all 110,000 cells in the second iteration, even though only 835 cells are not at the true solution. Similar trends are seen for Dataset B, Dataset C, and Dataset D.

According to aspects disclosed herein, an adaptive iterative method that only works on the unconverged cells during each iteration of Newton's Method takes advantage of the extremely non-uniform convergence behavior found in reservoir simulation datasets. FIG. 5 is a graph 50 showing a graphic representation of the Adaptive Newton Method according to aspects disclosed herein. The true solution that the reservoir simulator seeks to find at a particular time is given by the solid line 52. The initial guess 53 is everywhere relatively far from the true solution. Two iterations of an iterative solution method, such as Newton's Method, are shown by dashed lines 55, 56. Conventional application of an iterative solution method to reservoir simulators seeks to find the solution along the entire x-axis. According to disclosed techniques and methodologies, the Adaptive Newton's Method uses knowledge of the previous iterative method to only to continue to work in a subset of the modeled domain (the x-axis). This subset is the part of the solution space furthest from the true solution and is shown by the area 51. The Adaptive Newton's Method attempts no solutions in areas outside of area 51 as those areas have already converged.

Figure 6:
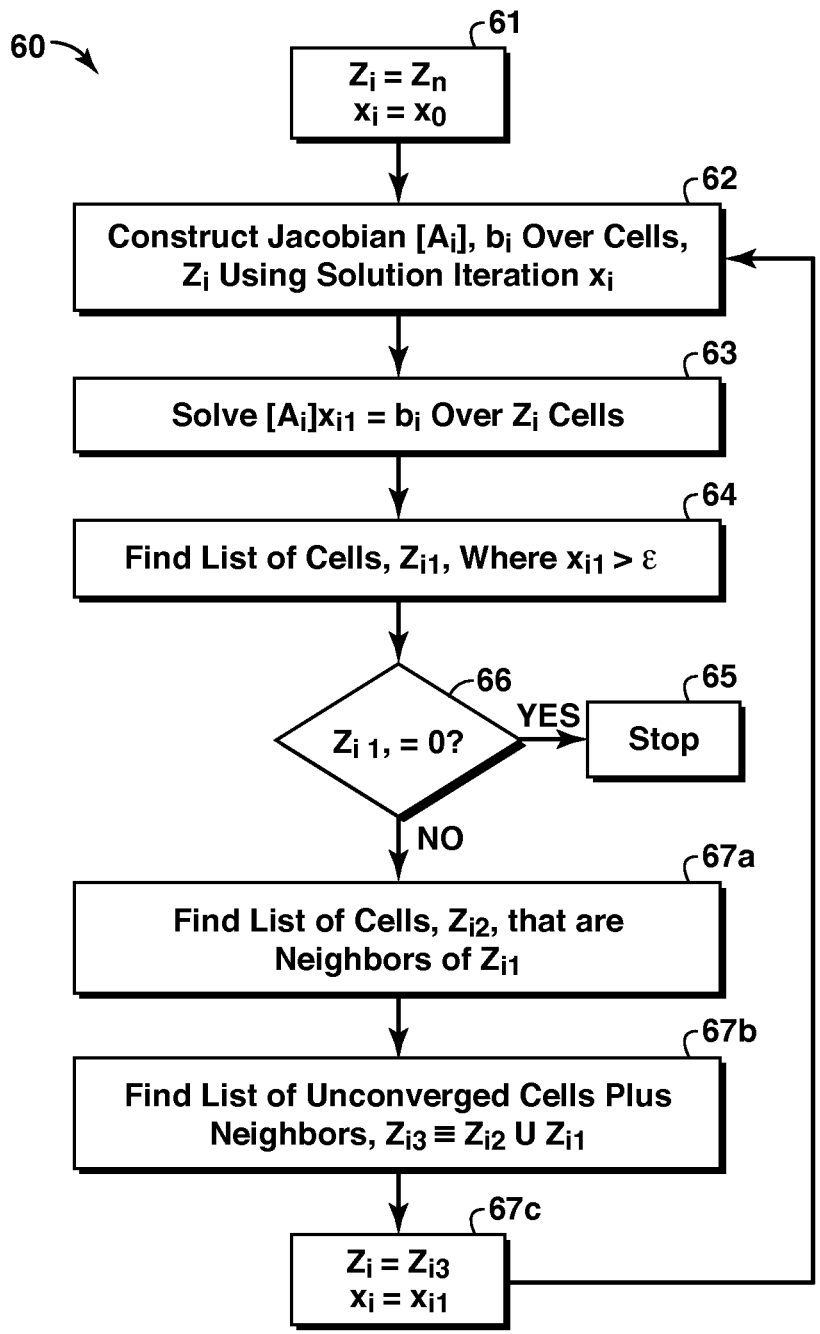
FIG. 6 is a flowchart of an Adaptive Newton's Method according to disclosed methodologies and techniques.
Figure 7A:
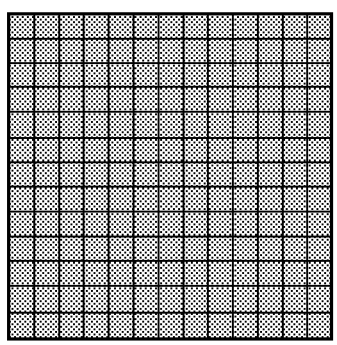
FIGS. 7A, 7B, 7C, and 7D are schematic diagrams showing convergence of a system of equations using the Adaptive Newton's Method.
Figure 7B:
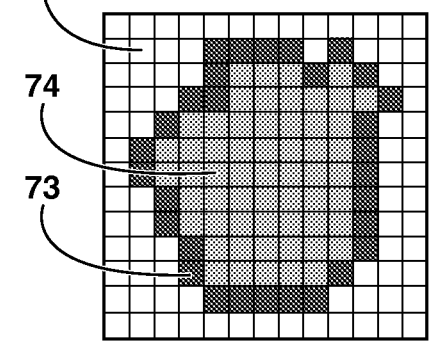
Figure 7C:
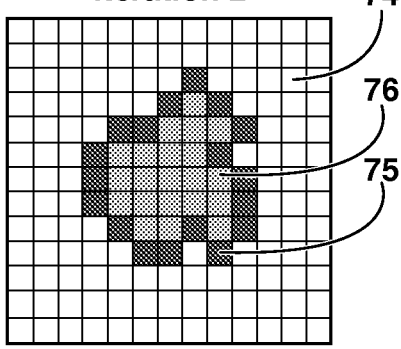
Figure 7D:
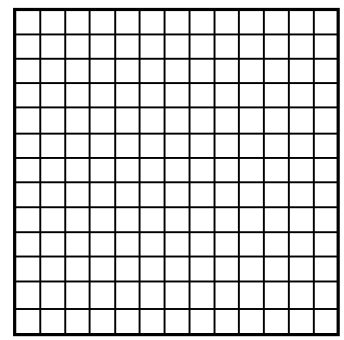

FIG. 6 is a flowchart of the Adaptive Newton's Method 60 that may be used to perform a simulation of a subsurface hydrocarbon reservoir according to disclosed aspects. The reservoir may be approximated by a reservoir model, which has a plurality of cells. Each cell has one or more equations (an equation set) characterizing one or more reservoir properties, such as fluid flow, in the cell. In this discussion the term "cell" may be used interchangeably with its associated equation set. At block 61 a solution vector $\vec{x}_i$, representing the solutions for the system of equations, is set to an initial guess $\vec{x}_0$. The number of cells to solve, $Z_i$, is set to the total number of cells $Z_n$. At block 62 a Jacobian Matrix $J_i$ and a vector $\vec{b}_i$ are constructed for all cells $Z_i$ using the solution vector $\vec{x}_i$. At block 63 a new solution estimate $\vec{x}_{i1}$ is obtained for cells $Z_i$. At block 64 it is determined which cells $Z_{i1}$ are unconverging, which may be defined as having associated equation sets that have not satisfied a convergence criterion $\epsilon$. If the number of unconverging cells is zero, then at block 65 the method stops. However, if at block 66 it is determined that the number of unconverging cells is not zero, then at block 67a the neighbors $Z_{i2}$ of the unconverged cells $Z_{i1}$ are found. At block 67b a new list $Z_{i3}$ is created comprising the unconverged cells $Z_{i1}$ and the neighbors $Z_{i2}$. At block 67c the new list $Z_{i3}$ becomes the list of cells to proceed in the next iteration. The solution guess vector $\vec{x}_i$ is set to the new solution estimate $\vec{x}_{i1}$, and the process returns to block 62. The method repeats until no cells are unconverging. At that point the system of equations may be considered solved.

Figure 2:
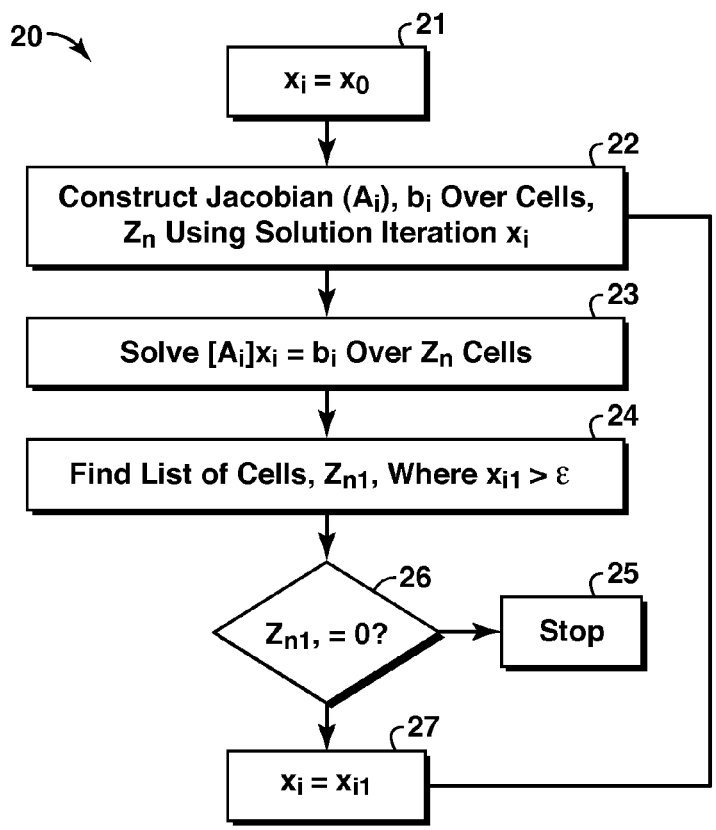
FIG. 2 is a flowchart showing steps used in executing the known Newton's Method.

In the iterative loop of the known Newton's Method (FIG. 2) the number of grid cells used to construct the Jacobian matrix J and the residual vector $\vec{b}_i$ is constant for every iteration. In the Adaptive Newton's Method (FIG. 6), only those cells where the solution has yet to be found, and their converged neighbor cells, are used in subsequent updates of the Jacobian matrix J and the residual vector $\vec{b}_i$. As a result, the size of the Jacobian matrix J and the vector $\vec{b}_i$ may vary with each iteration, and ideally will be much smaller than the fixed-sized Jacobian matrix J and $\vec{b}_i$ used with known methods. The successively smaller size of the systems of equations used by the adaptive approach means less computational resources and time are required to run a reservoir simulation when compared with known methods.

Figure 3A:
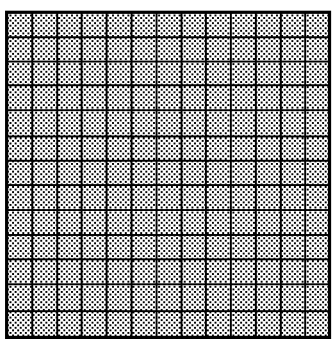
FIGS. 3A, 3B, 3C and 3D are schematic diagrams showing convergence of a system of equations using the known Newton's Method.
Figure 3B:
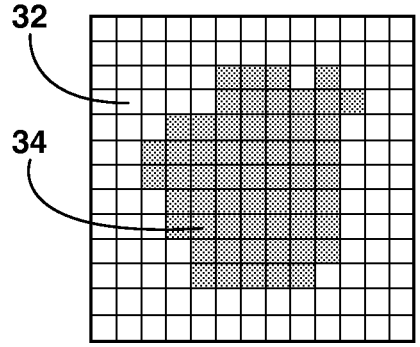
Figure 3C:
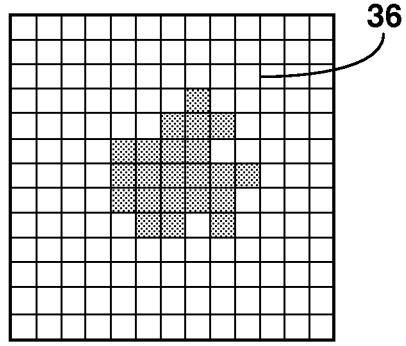
Figure 3D:
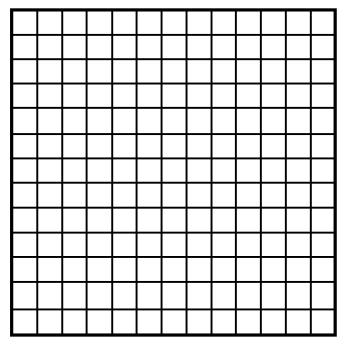

FIGS. 7A, 7B, 7C and 7D depict a two-dimensional 13-by-13 rectangular grid 70 similar to the grid 30 shown in FIGS. 3A-3D. Each cell in grid 70 has an equation set associated therewith. Prior to any iteration (FIG. 3A) the 169 equation sets are used as inputs to the Adaptive Newton's Method. After one iteration of the Adaptive Newton's Method (FIG. 3B) the equation sets associated with 111 cells have converged (shown by the lighter-colored cells 72 and 73). In other words, some areas of the reservoir have found solutions such that the term $(\vec{x}_i - \vec{x}_{i-1})$ is below $\epsilon$ for those areas. The unconverged cells are shown as darker colored cells 74. Instead of using all 169 equations sets in the second iteration (FIG. 3C), the Adaptive Newton's Method solves only for the unconverged equation sets (represented by cells 74) and the converged equation sets associated with the cells that neighbor cells 74 (in FIG. 3B, cells 73), which together number 88. After the second iteration (FIG. 3C) the equation sets associated with 147 cells have converged (cells 74 and 75) and the equation sets associated with 22 cells have not converged (cells 76). 39 equation sets (representing the number of unconverged cells 76 and their converged neighbor cells 75) are returned for a third iteration (FIG. 3D). After the third iteration is completed all equation sets have converged. The decreasing number of equation sets to be solved at each iteration of the Adaptive Newton's Method results in a significant time and computational savings over known methods.

Figure 8:
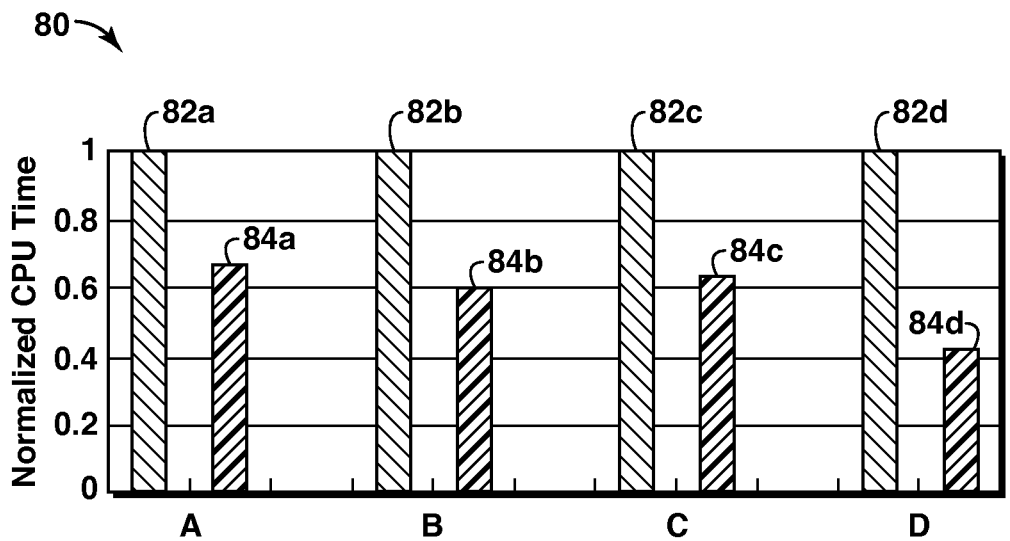
FIG. 8 is a graph comparing performance of the known Newton's Method and the Adaptive Newton's Method.

FIG. 8 is a chart 80 comparing computational time required to run a reservoir simulation for four empirical datasets A, B, C, and D. Bars 82a-82d represent the time required to perform a reservoir simulation according to the known Newton's Method, normalized to one. Bars 84a-84d represent the time required to perform the same reservoir simulations using the Adaptive Newton's Method disclosed herein. Initial runs of the Adaptive Newton's Method as disclosed herein resulted in improved solution times by a factor of about two, and it is expected further runs in a reservoir simulator will show even better performance improvements.

Aspects described herein use the Adaptive Newton's Method at each iteration. However, the smaller solution sets formed at the later iterations could be solved by root-finding methods that are more efficient for the smaller sizes of equation sets, such as a direct solver. Changing the size of the matrix as well as the type of method for each iteration is an additional variation.

Figure 9:
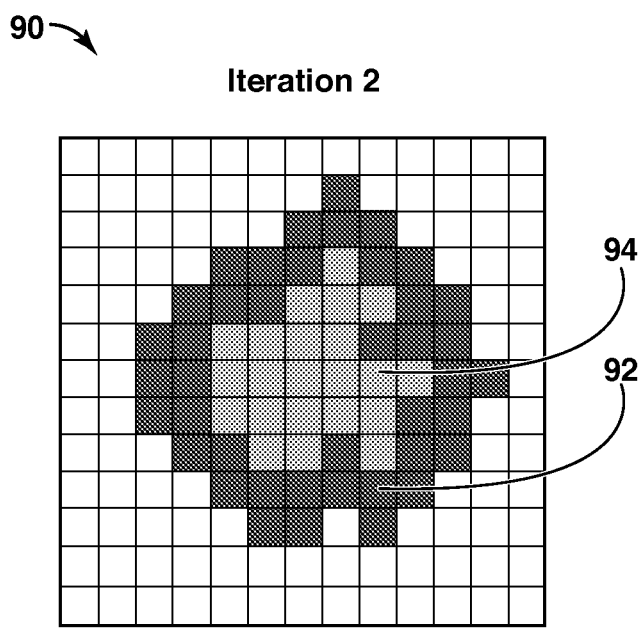
FIG. 9 is a schematic diagram showing a cell selection strategy according to disclosed methodologies and techniques.

As discussed previously, including cells bordering or neighboring converged cells helps the Adaptive Newton's Method work successfully. It is believed this is so because the border cells provide accurate boundary conditions to the unconverged cells. Previously disclosed aspects have used only one layer of neighbor cells, but in another aspect more than one layer of neighbors may be used. As this would increase the number of equation sets to be solved at each iteration, some of the solving time otherwise saved would be lost. However, having two or more layers of neighbor cells might be useful in making the method more robust for very difficult problems. FIG. 9 illustrates this idea with a 13-by-13 rectangular grid 90 similar to rectangular grid 70. On the second iteration of an iterative root solver such as the Adaptive Newton's Method, the nearest two neighbors 92 to each unconverged cell 94 are included in a subsequent iteration of the Adaptive Newton's Method. While this increases the number of equation sets to solve from 39 to 63, it still is significantly less than the known Newton's Method, which as demonstrated would use 169 equation sets in each iteration. In unusual cases the number of selected neighboring converged cells may total all but one of the converged cells, or alternatively may comprise a single converged cell. In other words the number of selected neighbor cells may be between 1 and W−1, where W is the number of cells having equation sets that satisfy the convergence criterion at the relevant iteration. Other strategies or methods to select the number and location of converged cells to be combined with unconverged cells are contemplated.

In another aspect, a post-Newton material balance correction/smoothing mechanism is disclosed. Because the global system is not solved at every single Newton iteration, some material balance errors or non-smoothness in the solution might be introduced. Among the possible approaches that can be used as a post-Newton smoother is known as an explicit molar update. Using the converged solution and updated reservoir properties on each cell, the molar fluxes on connections between cells can be calculated. The molar fluxes at each cell can be updated with $$N_{m,i}^{n+1} = N_{m,i}^n - \Delta t \sum_{j}^{conn} U_{m,i \to j}^{n+1} \qquad \text{[Equation 5]}$$

where $N_m^n$ is the moles for component m in cell i, $\Delta t$ is a timestep size, and $U_{m,i \to j}^{n+1}$, is the molar flux for component m between cell i and cell j with updated reservoir properties.

Another more sophisticated smoother is to use the idea of total volumetric flux conservation. With this scheme, the saturation correction can be computed while counting for any material balance errors or volume discrepancies in the system. One specific form with the volume balance formulation is shown here:

$$V_{P,i}^{n+1} \delta S_{v,i} + \Delta t \sum_{m}^{comp} \left(\frac{\partial V_v}{\partial N_m}\right)_i^{n+1} \sum_{j}^{conn} \sum_{k=i,j} \sum_{v'}^{phase-1} \left(\frac{\partial U_{m,i \to j}}{\partial S_{v',k}}\right)^{n+1} \delta S_{v',k} = \sum_{m}^{comp} \left(\frac{\partial V_v}{\partial N_m}\right)_i^{n} \varepsilon_{m,i}^{n+1} + \varepsilon_{v,i}^{n+1} \qquad \text{[Equation 6]}$$

In this equation, $V_{P,i}^{n+1}$ is pore volume, $V_{v,i}^{n+1}$ is phase volume, $S_{v,i}^{N+1}$ is phase saturation, $\delta S_{v,i}$ is saturation correction, and the material balance errors and phase volume discrepancies are $$\varepsilon_{m,i}^{n+1} = N_{m,i}^{n+1} - N_{m,i}^n - \Delta t \sum_{j}^{conn} U_{m,i \to j}^{n+1}$$ [Equations 7 and 8]

$$\varepsilon_{v,i}^{n+1} = V_{v,i}^{n+1} - (S_v V_P)_i^{n+1}$$

The molar flux can be updated with the saturation correction term as $$U_{m,i \to j}^{n+\gamma} = U_{m,i \to j}^{n+1} + \sum_{k=i,j} \sum_{v}^{phase-1} \left(\frac{\partial U_{m,i \to j}}{\partial S_{v,k}}\right)^{n+1} \delta S_{v,k}$$ [Equation 9]

Figure 10:
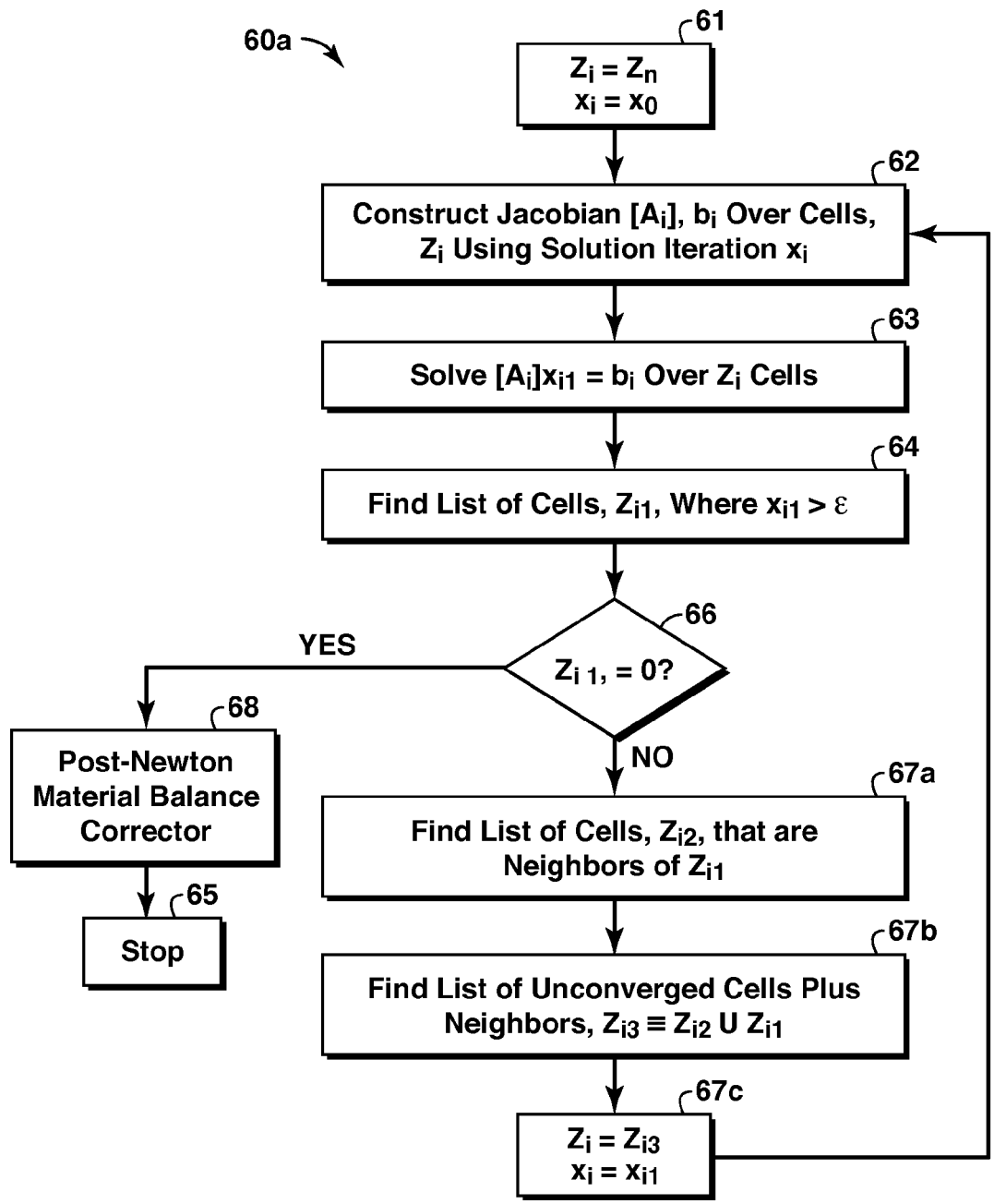
FIG. 10 is a flowchart of a method according to disclosed methodologies and techniques.

FIG. 10 is a flowchart showing a method 60a similar to the method shown in FIG. 6. Method 60a additionally employs a post-Newton material balance corrector. If at block 66 it is determined that the number of unconverging cells is zero or substantially zero, then at block 68 a post-Newton material balance corrector is employed as previously discussed. Once the material balance is corrected, at block 65 the method stops or ends.

Although methodologies and techniques described herein have used rectangular grids for demonstration purposes, grids of any size, type, or shape may be used with the disclosed aspects.

Figure 11:
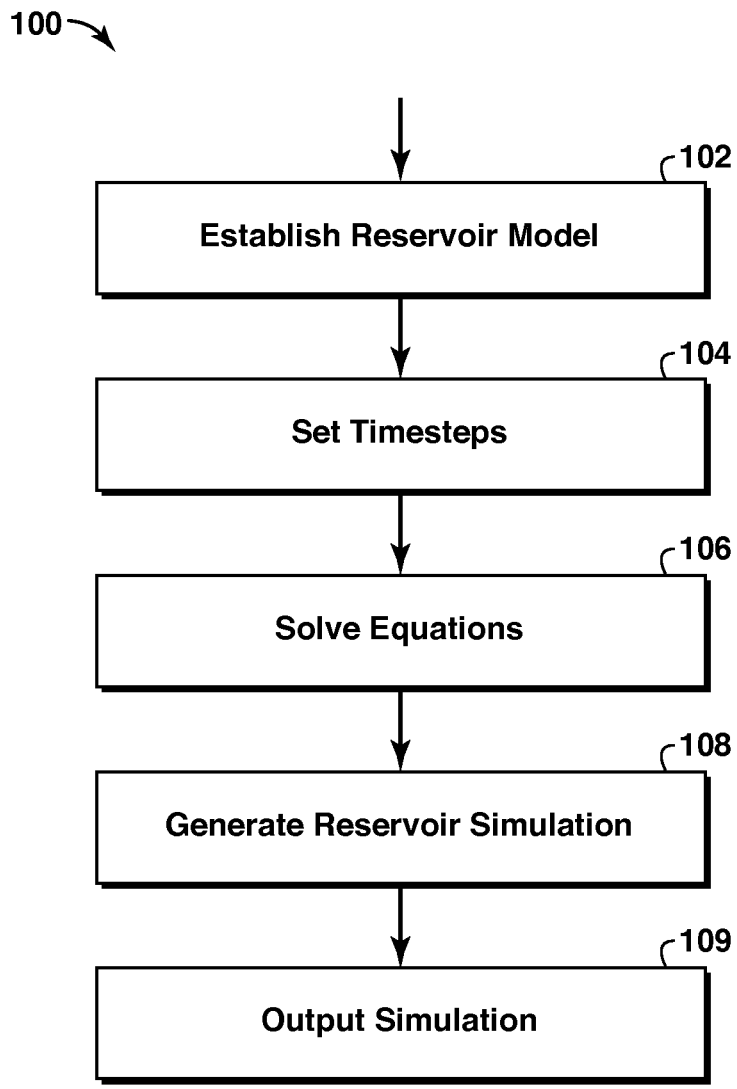
FIG. 11 is another flowchart of a method according to disclosed methodologies and techniques.

FIG. 11 is a flowchart showing a method 100 of performing a simulation of a subsurface hydrocarbon reservoir according to aspects described herein. At block 102 a model of the subsurface hydrocarbon reservoir is established. The model is formed of a plurality of cells. Each of the cells has an equation set associated therewith. The equation set includes one or more equations that represent a reservoir property in the respective cell. At block 104 the number and frequency of timesteps is set. The timesteps may be measured by any unit of time, such as seconds, months, years, centuries, and so forth. At block 106 solutions to the equation sets are discovered according to according to aspects and methodologies disclosed herein. For example the Adaptive Newton's Method, as disclosed herein, may be performed iteratively at each timestep. Based on the output of block 106, at block 108 a reservoir simulation is generated, and at block 109 the simulation results are outputted, such as by displaying the simulation results.

Figure 12:
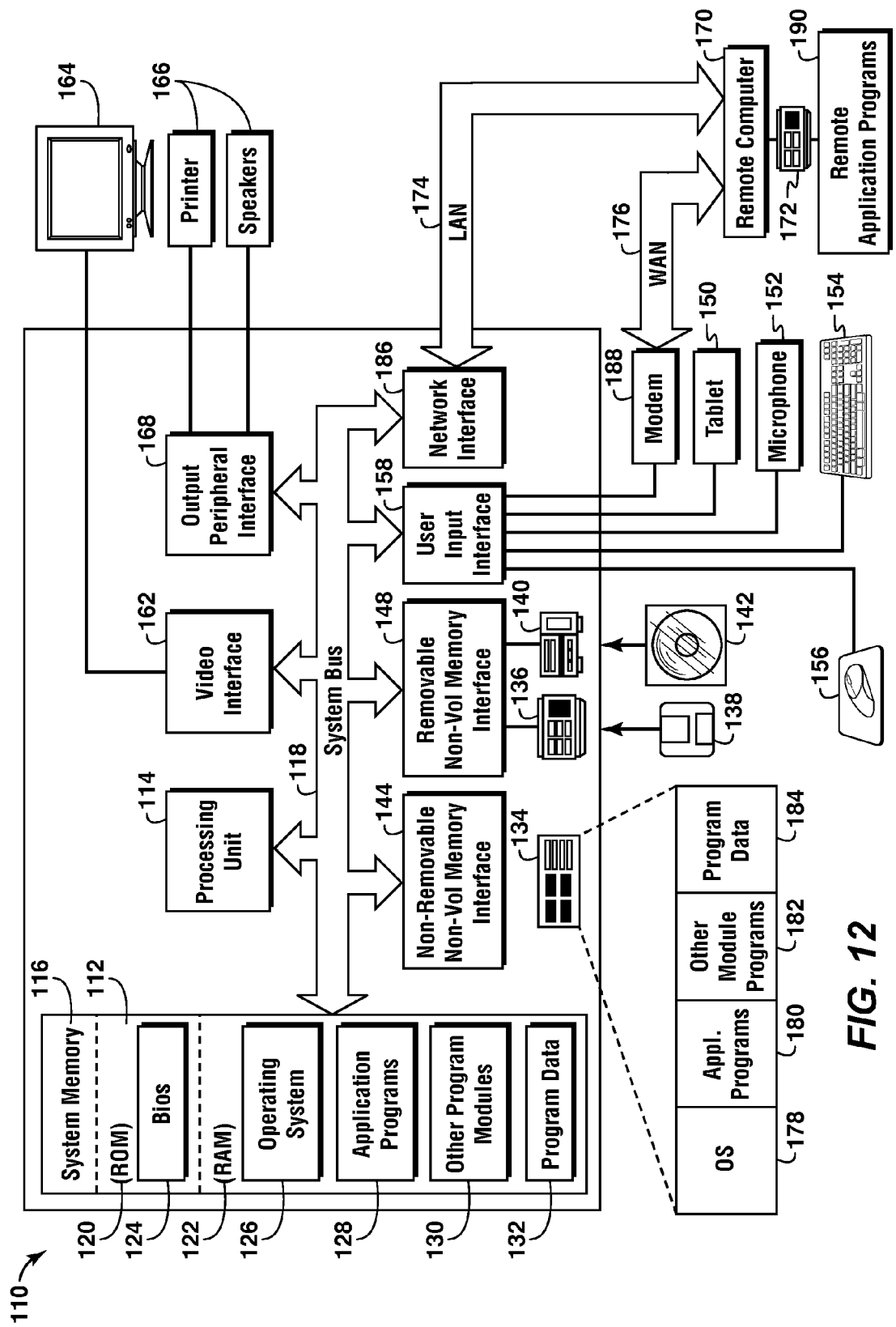
FIG. 12 is a block diagram illustrating a computer environment.

FIG. 12 illustrates an exemplary system within a computing environment for implementing the system of the present disclosure and which includes a computing device in the form of a computing system 110, which may be a UNIX-based workstation or commercially available from Intel, IBM, AMD, Motorola, Cyrix and others. Components of the computing system 110 may include, but are not limited to, a processing unit 114, a system memory 116, and a system bus 146 that couples various system components including the system memory to the processing unit 114. The system bus 146 may be any of several types of bus structures including a memory bus or memory controller, a peripheral bus, and a local bus using any of a variety of bus architectures.

Computing system 110 typically includes a variety of computer readable media. Computer readable media may be any available media that may be accessed by the computing system 110 and includes both volatile and nonvolatile media, and removable and non-removable media. By way of example, and not limitation, computer readable media may comprise computer storage media and communication media. Computer storage media includes volatile and nonvolatile, removable and non removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computing system 110.

The system memory 116 includes computer storage media in the form of volatile and/or nonvolatile memory such as read only memory (ROM) 120 and random access memory (RAM) 122. A basic input/output system 124 (BIOS), containing the basic routines that help to transfer information between elements within computing system 110, such as during start-up, is typically stored in ROM 120. RAM 122 typically contains data and/or program modules that are immediately accessible to and/or presently being operated on by processing unit 114. By way of example, and not limitation, FIG. 12 illustrates operating system 126, application programs 128, other program modules 130 and program data 132.

Computing system 110 may also include other removable/non-removable, volatile/nonvolatile computer storage media. By way of example only, FIG. 12 illustrates a hard disk drive 134 that reads from or writes to non-removable, nonvolatile magnetic media, a magnetic disk drive 136 that reads from or writes to a removable, nonvolatile magnetic disk 138, and an optical disk drive 140 that reads from or writes to a removable, nonvolatile optical disk 142 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 134 is typically connected to the system bus 146 through a non-removable memory interface such as interface 144, and magnetic disk drive 136 and optical disk drive 140 are typically connected to the system bus 146 by a removable memory interface, such as interface 148.

The drives and their associated computer storage media, discussed above and illustrated in FIG. 12, provide storage of computer readable instructions, data structures, program modules and other data for the computing system 110. In FIG. 12, for example, hard disk drive 134 is illustrated as storing operating system 178, application programs 180, other program modules 182 and program data 184. These components may either be the same as or different from operating system 126, application programs 130, other program modules 130, and program data 132. Operating system 178, application programs 180, other program modules 182, and program data 184 are given different numbers hereto illustrates that, at a minimum, they are different copies.

A user may enter commands and information into the computing system 110 through input devices such as a tablet, or electronic digitizer, 150, a microphone 152, a keyboard 154, and pointing device 156, commonly referred to as a mouse, trackball, or touch pad. These and other input devices often may be connected to the processing unit 114 through a user input interface 158 that is coupled to the system bus 118, but may be connected by other interface and bus structures, such as a parallel port, game port or a universal serial bus (USB).

A monitor 160 or other type of display device may be also connected to the system bus 118 via an interface, such as a video interface 162. The monitor 160 may be integrated with a touch-screen panel or the like. The monitor and/or touch screen panel may be physically coupled to a housing in which the computing system 110 is incorporated, such as in a tablet-type personal computer. In addition, computers such as the computing system 110 may also include other peripheral output devices such as speakers 164 and printer 166, which may be connected through an output peripheral interface 168 or the like.

Computing system 110 may operate in a networked environment using logical connections to one or more remote computers, such as a remote computing system 170. The remote computing system 170 may be a personal computer, a server, a router, a network PC, a peer device or other common network node, and typically includes many or all of the elements described above relative to the computing system 110, although only a memory storage device 172 has been illustrated in FIG. 12. The logical connections depicted in FIG. 12 include a local area network (LAN) 174 connecting through network interface 186 and a wide area network (WAN) 176 connecting via modem 188, but may also include other networks. Such networking environments are commonplace in offices, enterprise-wide computer networks, intranets and the Internet. For example, computer system 110 may comprise the source machine from which data is being migrated, and the remote computing system 170 may comprise the destination machine. Note however that source and destination machines need not be connected by a network or any other means, but instead, data may be migrated via any machine-readable media capable of being written by the source platform and read by the destination platform or platforms.

The central processor operating system or systems may reside at a central location or distributed locations (i.e., mirrored or stand-alone). Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. For example, a storage medium may be coupled to the processor such that the processor may read information from, and write information to, the storage medium. In the alternative, the storage medium may be integral to the processor. The processor and the storage medium may also reside in an application-specific integrated circuit (ASIC). The bus may be an optical or conventional bus operating pursuant to various protocols that are well known in the art. One system that may be used is a Linux workstation configuration with a Linux 64-bit or 32-bit Red Hat Linux WS3 operating system, and an NVIDIA Quadro graphics card. However, the system may operate on a wide variety of hardware.

Figure 13:
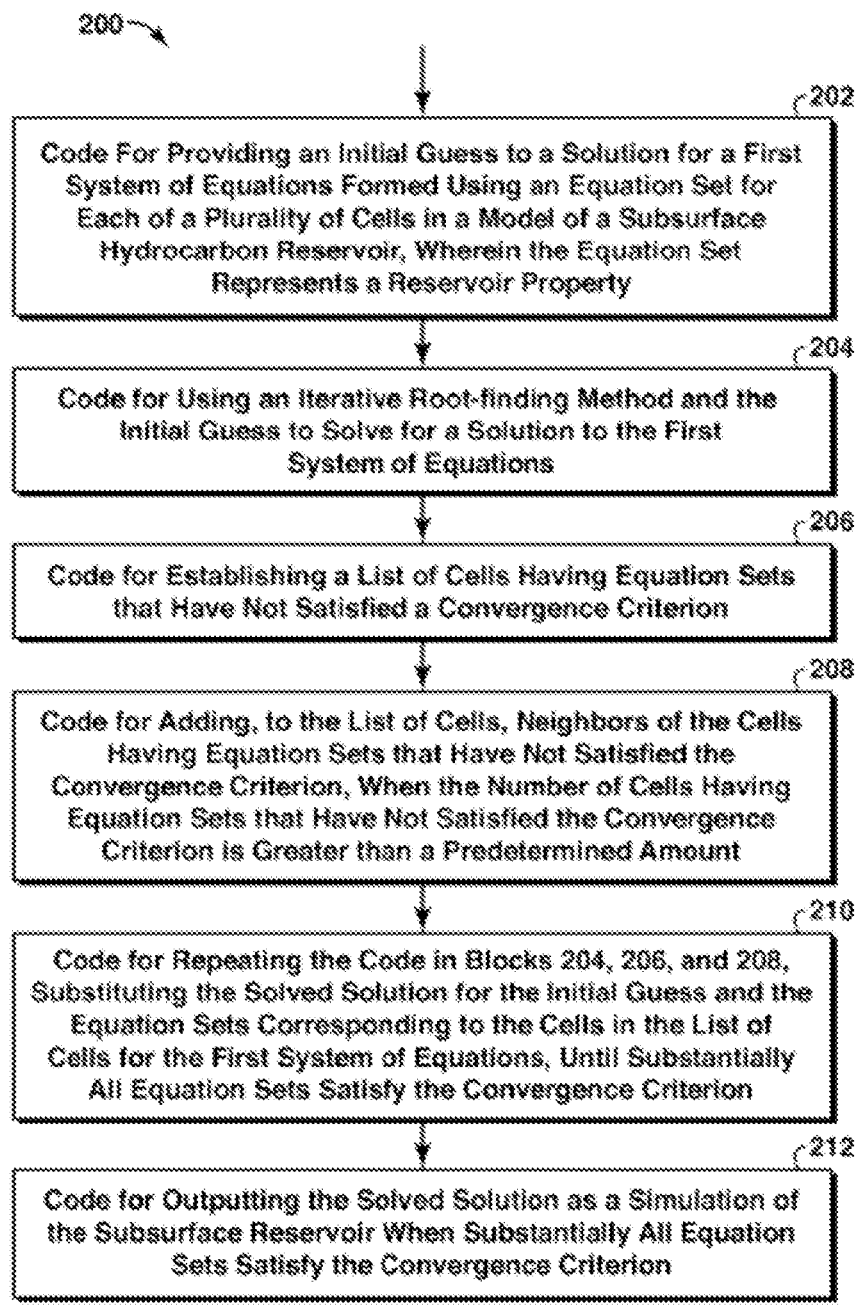
FIG. 13 is a block diagram of machine-readable code.

FIG. 13 shows a representation of machine-readable code 200 that may be used with a computing system such as computing system 110. At block 202 code is provided for providing an initial guess to a solution for a first system of equations formed using an equation set for each of a plurality of cells in a model of a subsurface hydrocarbon reservoir, wherein the equation set represents a reservoir property. At block 204 code is provided for using an iterative root-finding method and the initial guess to solve for a solution to the first system of equations. At block 206 code is provided for establishing a list of cells having equation sets that have not satisfied a convergence criterion. At block 208 code is provided for adding, to the list of cells, neighbors of the cells having equation sets that have not satisfied the convergence criterion, when the number of cells having equation sets that have not satisfied the convergence criterion is greater than a predetermined amount. At block 210 code is provided for repeating the code in blocks 204, 206 and 208, substituting the solved solution for the initial guess and the equation sets corresponding to the cells in the list of cells for the first system of equations, until substantially all equation sets satisfy the convergence criterion. At block 212 code is provided for outputting the solved solution as a simulation of the subsurface reservoir when substantially all equation sets satisfy the convergence criterion. Code effectuating or executing other features of the disclosed aspects and methodologies may be provided as well. This additional code may be placed at any location within code 200 according to computer code programming techniques.

Figure 14:
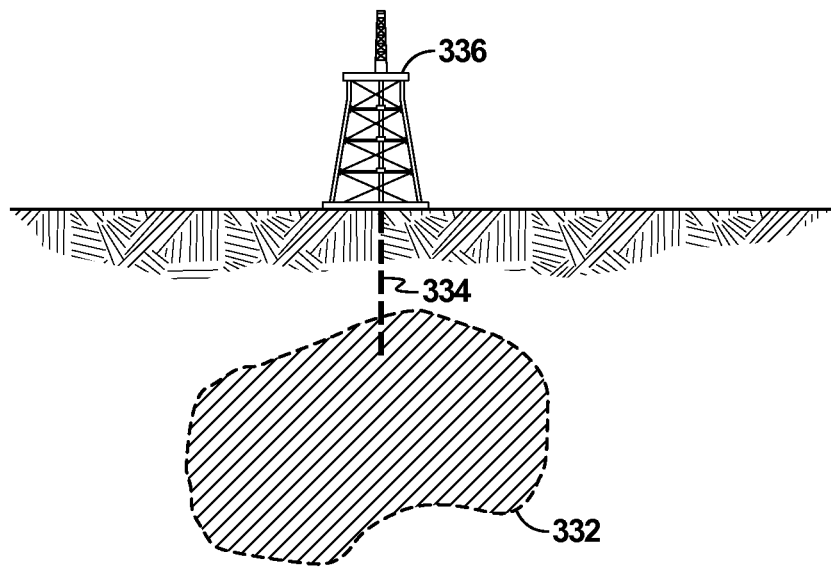
FIG. 14 is a side elevational view of a hydrocarbon management activity.
Figure 15:
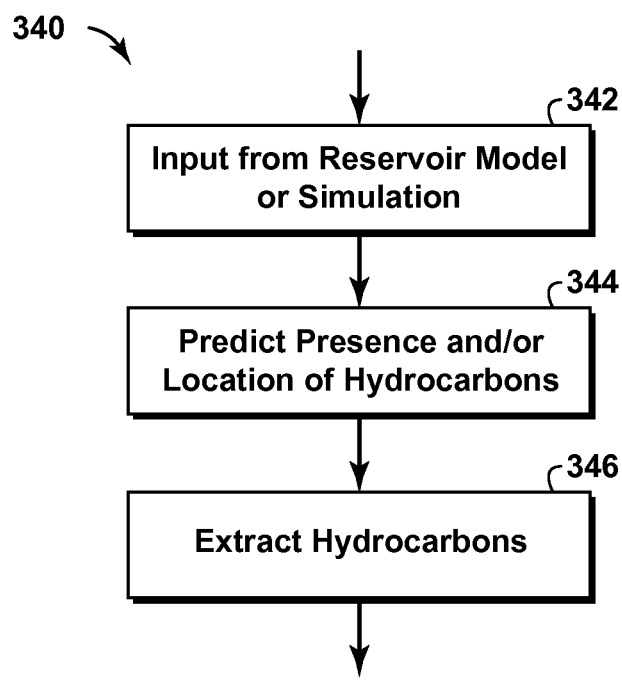
FIG. 15 is a flowchart of a method of extracting hydrocarbons from a subsurface region.

Aspects disclosed herein may be used to perform hydrocarbon management activities such as extracting hydrocarbons from a subsurface region or reservoir, which is indicated by reference number 250 in FIG. 14. A method 300 of extracting hydrocarbons from subsurface reservoir 252 is shown in FIG. 15. At block 302 inputs are received from a numerical model, geologic model, or flow simulation of the subsurface region, where the model or simulation has been run or improved using the methods and aspects disclosed herein. At block 304 the presence and/or location of hydrocarbons in the subsurface region is predicted. At block 306 hydrocarbon extraction is conducted to remove hydrocarbons from the subsurface region, which may be accomplished by drilling a well 254 using oil drilling equipment 256 (FIG. 14). Other hydrocarbon management activities may be performed according to known principles.

The disclosed aspects, methodologies and techniques may be susceptible to various modifications, and alternative forms and have been shown only by way of example. The disclosed aspects, methodologies and techniques are not intended to be limited to the specifics of what is disclosed herein, but include all alternatives, modifications, and equivalents falling within the spirit and scope of the appended claims.

What is claimed is:

1. A method of performing a simulation of a subsurface hydrocarbon reservoir, the reservoir being approximated by a reservoir model having a plurality of cells, each cell having associated therewith an equation set representing a reservoir property, the method comprising:
   (a) providing an initial guess to a solution for a system of equations formed using the equation set for each cell in the plurality of cells, wherein providing the initial guess comprises using a Jacobian matrix;
   (b) using an iterative root-finding method and the initial guess to solve for a solution to the system of equations in a computer;
   (c) establishing a list of unconverged cells, the unconverged cells having equation sets that have not satisfied a convergence criterion;
   (d) when the number of unconverged cells is greater than a predetermined amount, adding, to the list of unconverged cells, neighbor cells of the unconverged cells, each of said neighbor cells having an equation set that satisfies the convergence criterion;

(e) repeating parts (b), (c), and (d), substituting the solved solution for the initial guess or the most recent solved solution and substituting the equation sets corresponding to the cells in the list of unconverged cells for the system of equations or equation sets from the most recent iteration, until substantially all equation sets satisfy the convergence criterion, and wherein the size of the Jacobian matrix varies with each iteration;

(f) when substantially all equation sets satisfy the convergence criterion, employing a post-Newton material balance corrector and outputting the solved solution as a simulation of the subsurface reservoir; and (g) managing hydrocarbons based on the simulation.

2. The method of claim 1, wherein the reservoir property is at least one of fluid pressure and fluid saturation.

3. The method of claim 1, wherein some or all of the method is performed using a computer.

4. The method of claim 1, wherein the reservoir property is fluid flow.

5. The method of claim 1 wherein the iterative root-finding method comprises Newton's Method.

6. The method of claim 1, wherein the simulation of the subsurface reservoir is a simulation at a first timestep, the method further comprising:
(h) repeating parts (a) through (f) at additional timesteps; and
(i) outputting the solved solutions for the first timestep and the additional timesteps, the solved solutions simulating the subsurface reservoir over time.

7. The method of claim 1, wherein the neighbor cells are adjacent the cells having equation sets that have not satisfied the convergence criterion.

8. The method of claim 1, wherein the number of neighbor cells is between 1 and W−1, where W is the number of cells having equation sets that satisfy the convergence criterion.

9. The method of claim 1, wherein outputting the solved solution includes displaying the solved solution.

10. The method of claim 1, wherein the predetermined amount is zero.

11. The method of claim 1, wherein the post-Newton material balance corrector employs an explicit molar update or total volumetric flux conservation.

12. A method of performing hydrocarbon extraction including a simulation of a subsurface hydrocarbon reservoir, the reservoir being approximated by a reservoir model having a plurality of cells, each cell having associated therewith an equation set representing a reservoir property, the method comprising:
(a) estimating a solution for a first system of equations formed using the equation sets associated with the plurality of cells, wherein estimating the solution comprises using a Jacobian matrix;
(b) using an iterative root-finding method and the estimated solution to find a first solved solution to the first system of equations in a computer system;
(c) establishing a list of cells having equation sets that have not satisfied a convergence criterion;
(d) adding, to the list of cells, neighbors of the cells having equation sets that have not satisfied the convergence criteria;
(e) identifying a second solved solution to the equation sets associated with the cells in the list of cells;
(f) iterating parts (c), (d), and (e) until substantially all equation sets satisfy the convergence criterion, wherein the list of cells and the second solved solution are replaced each iteration, and wherein the size of the Jacobian matrix varies with each iteration;
(g) when substantially all equation sets satisfy the convergence criterion, employing a post-Newton material balance corrector and outputting the second solved solution as a simulation of the subsurface reservoir; and
(h) managing hydrocarbons based on the simulation.

13. The method of claim 12, wherein the second solved solution is identified using a direct solver.

14. The method of claim 12, wherein the second solved solution is identified using an iterative root-finding method.

15. The method of claim 14, wherein the iterative root-finding method is Newton's Method.

16. The method of claim 12, wherein the iterative root-finding method is Newton's Method.

17. A method of performing a simulation of a subsurface hydrocarbon reservoir over a plurality of timesteps, the reservoir being approximated by a reservoir model having a plurality of cells, each cell having associated therewith an equation set representing a reservoir property, the method comprising:
estimating a solution for a system of equations formed using the equation set for each cell in the plurality of cells, wherein estimating the solution comprises using a Jacobian matrix;
for each timestep, iteratively running a root-finding method to solve for a solution to the system of equations in a computer system, using as inputs either the initial guess or subsequent solutions derived from a previous iteration of the root-finding method, wherein each iteration within a timestep runs the root-finding method to solve for the solution using equation sets associated with a variable number of cells in the plurality of cells, wherein the variable number of cells comprise neighbors of the cells having equation sets that have not satisfied the convergence criteria, and wherein the size of the Jacobian matrix varies with each iteration;
employing a post-Newton material balance corrector and outputting the solved solution at each timestep when the equation sets associated with substantially all cells in the reservoir model satisfy a convergence criterion at said each timestep; and
managing hydrocarbons based on the simulation.

18. The method of claim 17, wherein the number of cells associated with the equation sets used to solve for the solution is varied based on the previous iteration solution.

19. The method of claim 17, wherein the variable number of cells includes cells having equation sets that have not satisfied the convergence criterion during the previous iteration, and a variable border area of cells having equation sets that have satisfied the convergence criterion during the previous iteration.

20. A computer program product having computer executable logic recorded on a non-transitory computer readable storage medium, the computer program product comprising:
(a) code for providing an initial guess to a solution for a system of equations formed using an equation set for each of a plurality of cells in a model of a subsurface hydrocarbon reservoir, wherein the equation set represents a reservoir property, wherein providing the initial guess comprises using a Jacobian matrix;
(b) code for using an iterative root-finding method and the initial guess to solve for a solution to the first system of equations;
(c) code for establishing a list of unconverged cells, the unconverged cells having equation sets that have not satisfied a convergence criterion;
(d) code for adding neighbor cells of the unconverged cells to the list of unconverged cells when the number of unconverged cells is greater than a predetermined amount, each of the neighbor cells having an equation set that satisfies the convergence criterion;

(e) code for repeating parts (b), (c), and (d), substituting the solved solution for the initial guess or the most recent solved solution and substituting the equation sets corresponding to the cells in the list of unconverged cells for the system of equations or equation sets from the most recent iteration, until substantially all equation sets satisfy the convergence criterion, and wherein the size of the Jacobian matrix varies with each iteration; and (f) code for employing a post-Newton material balance corrector and outputting the solved solution as a simulation for hydrocarbon management of the subsurface reservoir when substantially all equation sets satisfy the convergence criterion.

21. A method of managing hydrocarbon resources, comprising:

approximating a subsurface reservoir using a reservoir model having a plurality of cells, each cell having associated therewith an equation set representing a reservoir property;

estimating a solution for a system of equations formed using the equation set for each cell in the plurality of cells, wherein estimating the solution comprises using a Jacobian matrix;

for each timestep, iteratively running a root-finding method to solve for a solution to the system of equations in a computer, using as inputs either the initial guess or subsequent solutions derived from a previous iteration of the root-finding method, wherein each iteration within a timestep runs the root-finding method to solve for the solution using equation sets associated with a variable number of cells in the plurality of cells, wherein the variable number of cells comprise neighbors of the cells having equation sets that have not satisfied the convergence criteria, and wherein the size of the Jacobian matrix varies with each iteration;

simulating a characteristic of the subsurface reservoir using the solved solution at each timestep when the equation sets associated with substantially all cells in the reservoir model satisfy a convergence criterion at said each timestep, wherein simulating includes employing a post-Newton material balance corrector; and managing hydrocarbons based on the simulated characteristic.

22. The method of claim 21, wherein the simulated characteristic is fluid flow in the subsurface reservoir.

23. The method of claim 21, wherein managing hydrocarbons comprises extracting hydrocarbons from the subsurface reservoir.

* * * * *